United States Patent
Amir et al.

(10) Patent No.: US 6,856,421 B1
(45) Date of Patent: Feb. 15, 2005

(54) PAGE COMPOSITION SYSTEM

(75) Inventors: Gideon Amir, Gan-Yavne (IL); Noam Shaham, San Jose, CA (US); Yoram Arnon, Sunnyvale, CA (US); Lenny Ridel, Hod-Hasharon (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 09/509,753
(22) PCT Filed: Sep. 30, 1997
(86) PCT No.: PCT/IL97/00319
§ 371 (c)(1),
(2), (4) Date: Mar. 29, 2000
(87) PCT Pub. No.: WO99/17258
PCT Pub. Date: Apr. 8, 1999

(51) Int. Cl.⁷ .............................. G06F 3/12; G06F 12/00
(52) U.S. Cl. ..................... 358/1.18; 358/1.16; 358/453; 345/530; 345/421
(58) Field of Search ................................ 358/1.18, 450, 358/1.16, 1.17; 345/629, 530, 421

(56) References Cited

U.S. PATENT DOCUMENTS

| | | |
|---|---|---|
| 4,334,246 A | 6/1982 | Saran |
| 4,577,219 A | 3/1986 | Klie et al. |
| 4,679,038 A | 7/1987 | Bantz et al. |
| 5,136,688 A * | 8/1992 | Morikawa et al. ......... 358/1.16 |
| 5,428,724 A * | 6/1995 | Silverbrook ................ 345/640 |
| 5,600,768 A | 2/1997 | Andresen |
| 5,764,248 A * | 6/1998 | Scarpetti ......................... 347/2 |
| 5,912,672 A * | 6/1999 | Liguori ........................ 345/619 |
| 5,946,451 A * | 8/1999 | Soker ........................... 358/1.9 |
| 6,181,435 B1 * | 1/2001 | Onodera .................... 358/1.14 |
| 6,466,210 B1 * | 10/2002 | Carlsen et al. .............. 345/629 |

FOREIGN PATENT DOCUMENTS

| | | |
|---|---|---|
| EP | 0 048 625 | 3/1982 |
| EP | 0 459 711 | 12/1991 |
| EP | 0 578 256 | 1/1994 |
| EP | 0 702 328 | 3/1996 |
| EP | 0 741 485 | 11/1996 |
| WO | WO 95/02224 A1 | 1/1995 |

* cited by examiner

Primary Examiner—Edward Coles
Assistant Examiner—Alan Rahimi
(74) Attorney, Agent, or Firm—Fenster & Company

(57) ABSTRACT

A page composition method for composing a page from elements in pixelized form for bit-mapping or half-toning prior to printing including; (a) determining the positions of the elements on a printed page; (b) dividing the page into bands; (c) serially transferring pixel data values for sections of bands corresponding to the portions of respective elements in a band, seriatim to a buffer memory, wherein the data from the portion of one element in a band is completely read prior to reading data corresponding to the portion of a second element in the band; (d) writing the data to a buffer memory as it is read; and (e) transferring the data from the buffer memory when all the data corresponding to all portions of all elements in the band is written in the buffer memory.

19 Claims, 2 Drawing Sheets

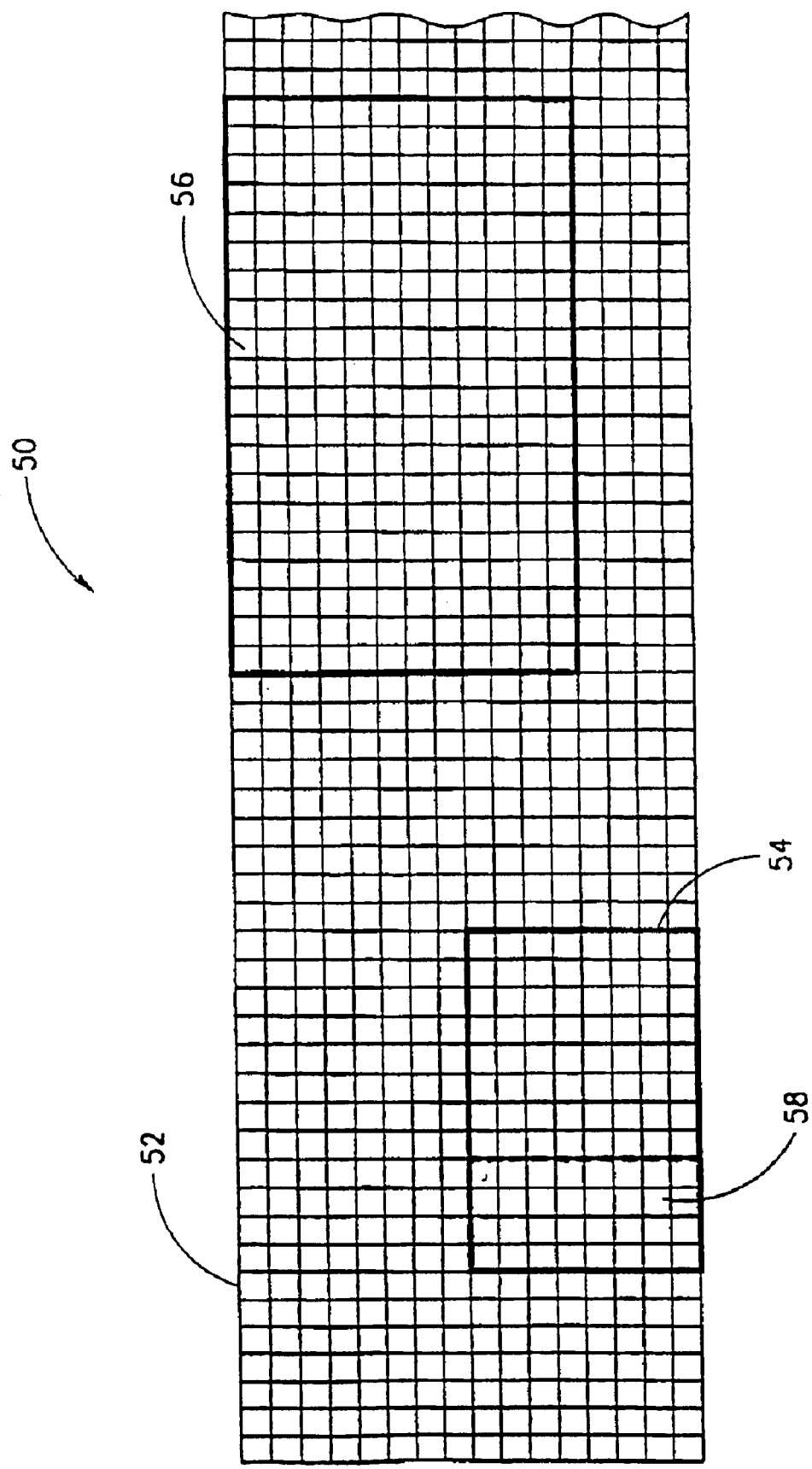

PAGE COMPOSITION SYSTEM

RELATED APPLICATION

The present application is a US national stage application of PCT/IL97/00319, filed 30 Sep. 1997.

FIELD OF THE INVENTION

The present invention relates to page composition systems for printers.

BACKGROUND OF THE INVENTION

Page make-up systems are a well established art. In particular it is known to form a page to be printed from a number of elements which may be text, image or line-work elements. Such elements may in general overlap and systems exist which choose to treat portions of one of the overlapping elements as being "transparent" with respect to the other element, i.e., portions through which underlying elements can be seen.

In PCT publication number WO 95/02224, the assignee's of the present application described a system in which non-overlapping elements could be effectively combined on-line to form a page. In this publication, elements are stored in bit-mapped (half-toned) form together with a control database which describes the position and extent of the elements. The control database is also described as including a description of positions and extents of blank regions between the elements.

In use, the device described in WO 95/02224 constructs a page on a line by line basis by sweeping through the element memories and writing the bit map from the element memories (and zeros for the spaces) on a line by line basis into a page memory.

This system, while it does allow for the efficient and quick placement and writing of the elements into a page, with great flexibility as to placement within the page, does have a number of limitations. In particular, closely spaced non-rectangular elements, such as, for example, italic letters, require decomposition of the letter into a large number of elements, each of which must be addressed and separately read into the printing memory. This reading requires a large number of time consuming switches between non-sequential memory locations in order to write each line. Another example of such a problem is the situation in which text is overwritten onto an image. The described system requires that the image and text be decomposed into a large number of non-overlapping rectangular elements in order for the image to be handled.

Furthermore, the system of WO 95/02224 teaches that an entire line of the page be written into memory at one time. This generally requires that the spaces (the blank areas) also be written into the memory. Thus, if for example, a line contains portions of a large number of elements and spaces then the number of switches between non-sequential memories in which the elements are stored may be so large as to severely limit the throughput of the system.

Furthermore, since elements have a varying extent and position in a cross-scan direction, it is necessary to scan the entire page prior to printing and the use of buffers is thus made more difficult and expensive.

Finally, since the images, especially in bit mapped (half-toned) form, are very large and the number of possibilities of bit mapped combinations of elements may also be very large, saving the possible bit maps may be very memory intensive and the printing memory requirements for a relatively small job may be large. It particular, in a card printing embodiment of the PCT publication, in which italic script names are printed in white overlaying an image, millions of possible combinations of elements must be provided to allow for the wide variety of possible names to be printed.

SUMMARY OF THE INVENTION

It is an object of some aspects of the present invention to provide solutions to various of the limitations of prior art.

In particular, according to one aspect of the invention, pages may be composed, bit-mapped (half-toned) and printed, on-line, in real time.

According to a second aspect of the invention, elements may be overlaid with portions of one of the elements being designated as transparent to others. This allows for a large number of combinations of elements to be formed from rectangular elements without storage of large numbers of sub-elements.

According to another aspect of the invention, only a portion of the page is composed at one time. When the composition of that portion is completed, it is sent to be printed while a following portion of the image is being composed. This section-wise composition and printing allows for using a small number of relatively small buffer memories. This also allows for the on-line bit-mapping of the image from pixelized data (continuous tone) in element memories without the need for composing a full page prior to bit mapping. Alternatively, the elements are already in bit-mapped form and are composed in that form and sent directly to printing.

In accordance with a further aspect of the invention, the section-wise decomposition of the elements is in accordance with a strip-wise division of the printed page. The full extent, within the strip, of elements in memory are read and written into a buffer memory which then comprises a pixelized continuous tone image of the strip of the page to be printed.

In a preferred embodiment of the invention, rather than the writing being performed by sequential lines requiring a number of memory switches per line as in the aforementioned WO 95/02224, the entire extent of the element in the strip is written prior to the writing of a second element into the buffer.

Further, in a preferred embodiment of the invention, blank spaces between elements are not written at all. Preferably, prior to writing the elements into the buffer, the buffer is initialized to zero such that no information need be transferred to the buffer in order to print "blank" space.

According to some preferred embodiment of the invention, the elements are stored in bit mapped form. According to other preferred embodiments of the invention, the increase in speed is sufficient to allow for on line composition and half-toning (bit mapping). In this case, the element data which may be image, text or line data which has preferably been RIPed into pixelized data ("continuous tone") is half toned and stored in RAM or page memory in bit-mapped form or sent directly for printing after half-toning.

There is thus provided, in accordance with a preferred embodiment of the invention, a page composition method for composing a page from elements, in a continuous tone pixelized form or in a bit-mapped form, for printing comprising:

(a) determining the positions of the elements on a printed page;

(b) dividing the page into bands;

(c) serially transferring pixel data values for sections of bands corresponding to the portions of respective elements in a band to a buffer memory, wherein the data from the portion of one element in a band is completely read prior to reading data corresponding to the portion of a second element in the band;

(d) writing the data to a buffer memory as it is read; and (e) transferring the data from the buffer memory when all the data, corresponding to all portions of elements in the band, is written in the buffer memory.

In one preferred embodiment of the invention, the elements are divided into sections and each section is addressed in accordance with a listing of memory positions.

In an alternate preferred embodiment of the invention, the elements are not divided into sections, per se. However, the reading of the elements is performed on the basis that that sections of all elements in a band are read into a single buffer before the rest of the portions of the element are read into subsequent buffers. This can be accomplished, for example, by reading an element to the end of the band or the end of the element, which ever comes first. This, in a sense, sections or decomposes the element automatically.

In a preferred embodiment of the invention, certain of the pixel values in certain elements are indicated as being transparent. No data is written into the buffer memory for such pixel values.

In accordance with a preferred embodiment of the invention, the method includes:

determining the relative layer of the overlapping elements, wherein the portions of the elements are transferred to the buffer memory in an order which corresponds to the determined relative layer of the overlapping elements. Preferably, certain of the pixel data values are indicated as being opaque and pixel data from an underlying layer is replaced by data from an overlying opaque layer. Preferably, certain of the pixel values are indicated as being of a transitional nature and the data in the buffer is a combination, preferably a weighted average, of the data in an overlapping layer and in an underlying layer. Alternatively, the transition may be governed by any logical or mathematical function.

In a preferred embodiment of the invention, after transfer of data corresponding to a band, to a buffer memory, is completed, the data is transformed into bit mapped form suitable for printing.

In a preferred embodiment of the invention, after transfer of all of the data corresponding to a given band to a buffer memory is completed, (c)–(e) are repeated for a second band. Preferably, the data for the second band is transferred into a second buffer memory. Preferably, the data corresponding to the second band is transformed into bit mapped form suitable for printing after data for the first band is so transformed.

In a preferred embodiment of the invention the pixel values in a buffer memory are transferred after data from the memory is transferred therefrom. Preferably, (c)–(e) are repeated for an additional band, wherein said data is written into a buffer memory into which data for another band was written previously after such data is transferred therefrom.

SHORT DESCRIPTION OF THE DRAWINGS

Other aspects and objects of the invention will become obvious from the following detailed description of the invention, to be read in conjunction with the claims in which:

FIG. 3 shows, in detail, the layout and reading of element memories, in accordance with a preferred embodiment of the invention.

DESCRIPTION OF PREFERRED EMBODIMENTS OF THE INVENTION

Figure 1:
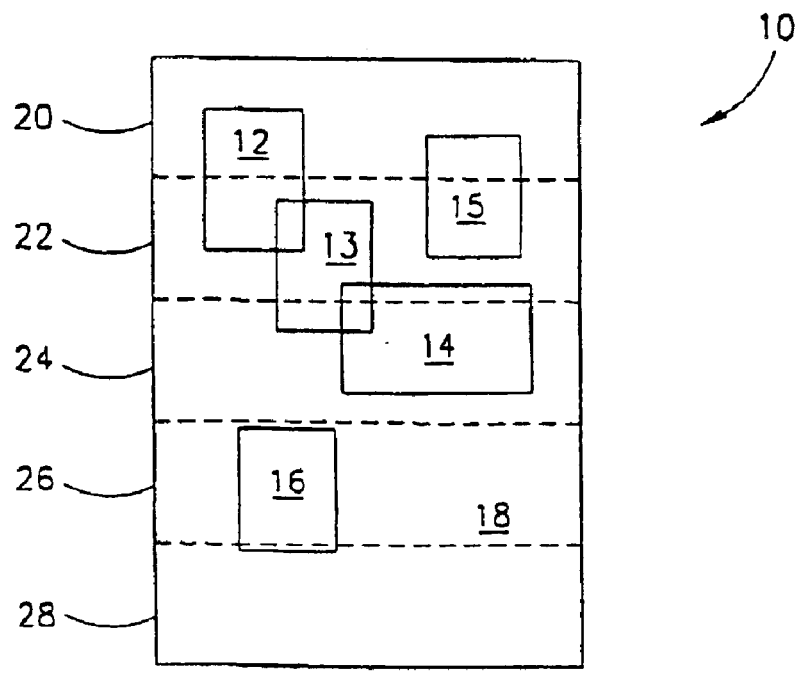
FIG. 1 shows a page composition, showing overlapping elements to be printed.

FIG. 1 shows the layout 10 of a page to be printed including five elements 12–16. Optionally, an additional element 18 may be comprised as a background which is printed in conjunction with elements 12–16.

In a preferred embodiment of the invention, the page is divided into a plurality of strips 20, 22, 24, 26 and 28, which together cover the entire page to be printed.

Figure 2:
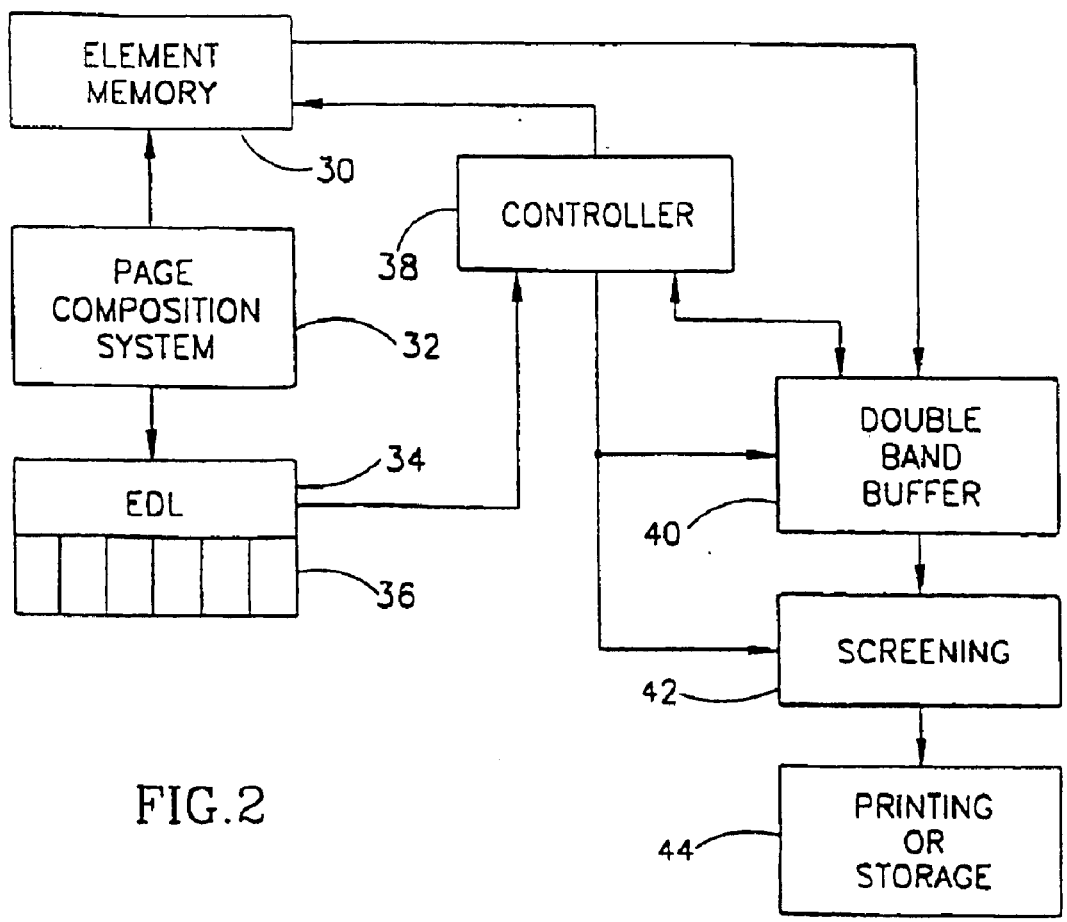
FIG. 2 shows a block diagram of a flow chart of the process of reading a strip of a page into a buffer memory.

FIG. 2 shows a block diagram of a preferred method and apparatus of carrying out the invention. Prestored sub-page elements, preferably rectangular elements, are retrieved from an element memory 30 and are placed on a page using a page composition system 32 which may be any such suitable system which is known in the art. These elements are either image, text or line work elements and are generally in pixelized continuous tone form, i.e., although in some preferred embodiments of the invention, the elements may be in bit mapped (half-tone) form.

An operator, preferably using an external page composition system will place the " " elements on a screen to form the layout of a page to be printed. As indicated above, certain of the elements contain transparent portions, i.e., portions which do not print. When these portions overlap opaque portions of other elements, the opaque portion should be displayed (and printed). When opaque elements overlap, the operator will indicate which elements are above others. The overlying elements print. Preferably, transparent pixels or other portions of elements are indicated by particular pixel values. Alternatively, certain pixels may be specified as transition pixels in which case the values of the pixels are merged with the values in a lower layer.

The information on the placement of the elements, their extent and position in a memory 30 as well as information on which elements overly which other elements is preferably transmitted to an element descriptor list (EDL) 34, preferably automatically or, alternatively, manually by the operator.

The page is then preferably divided into bands. While FIG. 1 shows the page as being divided into only 5 bands, for ease of illustration, in general the bands are relatively narrow such that a large number of bands are required for each page. In a practical, exemplary system a band is 16 pixels long (in the cross-scan direction of the page) but have the full width of the page. In the exemplary system 16 pixels equals approximately ½ mm. This division is relatively arbitrary and the bands can be either narrower or, more preferably, wider, depending on the size of buffer memories (as described below) which are to be used.

As part of the decomposition into bands, those elements which have at least a portion of the element in the band are identified. Those elements which end in the band are also identified.

An element descriptor (ED) 36 for each band is thus preferably formed which ED includes the element in the band, generally described by the position of the upper left corner thereof, the position of an end of element in the band and the address, in the element memory, of the starting point of the element in the particular band.

The information related to each of the bands is then transferred seriatim to a controller 38 which may be either a hardware controller or which may be implemented in software. Controller 38 then retrieves (preferably, in the manner described below) the portions of the elements in the first band from element memory 30 and transfers them, pixel by pixel or preferably, in larger groups, to a first memory in a double band buffer 40. When the entire band has been transferred to the first buffer memory, the controller switches memories so that subsequent data, comprising the second band, is placed in into a second buffer memory. At the same time, the information stored in the first buffer memory is sent to a screening module 42 which screens the pixelized data so that it is in a form suitable for screen printing or for intermediate storage prior to printing (44). Alternatively, the entire page may be stored either in non-bit mapped form for later screening into printable half-tone form or in bit-mapped form.

Alternatively, the elements are not decomposed into portions prior to data transfer to the buffer. Rather, each element in the band is read and written to the buffer until the bottom of the band (and buffer) is reached. In the next band, reading starts from the point at which reading concluded in the previous band. Reading of data for an element thus continues on a band-by-band basis until the bottom of the element is reached.

Screening module 42 may be implemented in software or in hardware. This transfer of data and screening is preferably performed on a line by line basis and read out of the first buffer on that basis.

Similarly, when data for the second band has been completely transferred from element memory 30 into the second buffer memory, the third band is transferred into the first buffer memory and the information relating to the second band is transferred to the screening module.

As indicated above, prior art systems transferred information from the element memory to an image memory line by line based on the lines of the page. This results in a large number of switches between non-sequential element memory locations for each line since many different elements have to be read for each page. These switches, together with the writing of white space slows down the transfer of data and may take longer than the actual data transfer itself. In a preferred embodiment of the invention the reading of data from the element memory and the writing into the buffer memories is performed in a manner which minimizes the switches from element memory to element memory and thus allows for increased speed of reading data from the element memories into the buffer memories.

FIG. 3 shows a portion of a single band 50 of a page to be printed, in accordance with a preferred embodiment of the invention. As indicated above, in a practical embodiment of the invention, band 50 is 16 pixels wide. For an A4 page at this resolution, the width of a band would be over 5000 pixels wide. Thus, FIG. 3 shows only a portion of the width of the band.

A number of elements, or rather portions of elements, are shown in FIG. 3. Element segment 52 is part of an element which neither starts in nor ends in the band (although it may end or begin at the edge of the band). Element 52 covers the entire portion of the band. Element 54 is an element which starts in the band but which does not end in the band (although it may end at the edge of the band) and which overlaps element 52. Element 56 ends in the band but does not start in the band (although it may start at the beginning of the band). Elements 52 and 54 overlap in a region 58. Preferably each element is assigned a layer number, with the elements having a higher layer number overlapping those with a lower layer number.

In a preferred embodiment of the invention the data in the entire portion of an element in a band is read (and written to the buffer memory) before the data from another element is read. In general the data from the lowermost layer is read first and written into the buffer. Then the element in the next layer is read into the buffer, it being understood that each element (or at least elements that can overlap) are in different layers. Thus, for example, if element 52 is in the lowermost layer 54 is in the next layer and 56 is in a higher layer, the data in element 52 is read prior to reading the data from elements 54 and 56. To the extent that a later layer is transparent, it is not written to the buffer. If the later layer is opaque, it overwrites the lower layer and only the upper layer is printed.

In one preferred embodiment of the invention, the data is read on a pixel-by-pixel/line-by-line basis from the element memory in which element 52 is stored. The data is written into the buffer memory as it is read, in a position in the buffer memory corresponding to the position in which it is to be printed. In an especially preferred embodiment of the invention, the data in the elemental sections are read in blocks, for example in blocks of 4×4 pixels. Thus, four lines are read and written at a time. This results in a increase in speed of transfer of data from the element to the buffer memories at the expense of a limitation on the positions of the edges of the elements, since this arrangement for reading the data results in a requirement that the dimension, in pixels, of an element be divisible by 4.

As indicated above, in accordance with a preferred embodiment of the invention, if element 54 is designated as being "transparent" in area 58, data from this area is not written into the buffer memory.

After completion of the writing of the data from element 52 into the buffer memory. Element 54 is written into the buffer memory. Again, 4×4 areas of the data are read and transmitted together such that four lines at a time are read and written (if they are not transparent). Then, element 58 is read and written in the same manner. It should be understood that, in general, portions of the overlapping element may be transparent (and thus not printed) and portions may be opaque (and thus the data in the upper layer overlaps the data in the lower layer is printed).

It should be realized that by using this methodology of reading the element memories and writing the buffers only two switches of element memory need be performed in writing elements 52, 54 and 56 (three switches if the initial switch to element 52 is considered). In the prior art system, nine switches are required even if four lines are read at once and even if the system ignores the non-written areas. If non-printed pixels are also scanned in element memory, many more switches are required. This reduction in the number of memory switches in accordance with a preferred embodiment of the invention, results in improved throughput, generally in greatly improved throughput.

In a further preferred embodiment of the invention, some of the pixels are designated as being of a translational nature. Such pixels are given a density value and a transition value. Preferably, when such a pixel overlays an opaque pixel the value in the buffer memory is based on both the overlaying and underlying pixel values. For example, this type of pixel value can be used to provide a transition between two images, with the edges of the overlying image being given the transitional values. These transitional values could, for example designate a weighted average of the pixel values which is to be used. This weighted average may, of course change from pixel to pixel.

After the portions of the elements in the first band are written into the memory, the elements in the band are read out to a bit mapping system which generates bit mapped screen information for printing. Simultaneously, the image in a second band is composed in a

What is claimed is:

1. A page composition method for composing a page from elements in a continuous tone pixelized form or in a bit-mapped form for printing comprising:
   (a) determining the position of the elements on a printed page;
   (b) dividing the page into bands;
   (c) serially transferring pixel data values for sections of bands corresponding the portions of respective elements in a band, to a buffer memory, wherein the data from the portion of one element in a band is completely read prior reading data corresponding to the portion of the second element in the band;
   (d) writing the data to the buffer memory as it is read; and
   (e) transferring the data from the buffer memory when all the data corresponding to all portions of all elements in the band is written in the buffer memory,
   wherein a band contains overlapping portions of two elements.

2. A page composition method according to claim 1 wherein certain of the pixel values in certain elements are indicated as being transparent and wherein no data is written into the buffer memory for such pixel values.

3. A page composition method for composing a page from elements in a continuous tone pixelized form or in a bit-mapped form for printing comprising:
   (a) determining the position of the elements on a printed page;
   (b) dividing the page into bands;
   (c) serially transferring pixel data values for sections of bands corresponding the portions of respective elements in a band, to a buffer memory, wherein the data from the portion of one element in a band is completely read prior reading data corresponding to the portion of the second element in the band;
   (d) writing the data to the buffer memory as it is read; and
   (e) transferring the data from the buffer memory when all the data corresponding to all portions of all elements in the band is written in the buffer memory, and including:
   determining the relative layer of the overlapping elements,
   wherein the portions of the elements in the band are transferred to the buffer memory in an order which corresponds to the determined relative layer of the overlapping elements.

4. A page composition method according to claim 3 wherein certain of the pixel data values are indicated as being opaque and wherein pixel data from an underlying layer is replaced by data from an overlying opaque layer.

5. A page composition method according to claim 3 wherein certain of the pixel data values are indicated as being transitional in nature and wherein the data in the buffer is a combination of the data in an overlapping layer and an underlying layer.

6. A page composition method according to claim 5 wherein the combination of data is a weighted average of the pixel values in the upper and lower layers.

7. A page composition method according to any of claims 1–6 wherein after transfer of data corresponding to a band, to a buffer memory is completed, the data is transformed into bit mapped form suitable for printing.

8. A page composition method according to any of claims 1–6 wherein after all of the data corresponding to a given band to a buffer memory is completed, (c)–(e) are repeated for a second band.

9. A page composition method according to claim 8 wherein data for the second band is placed in a second buffer memory.

10. A page composition method according to claim 9 wherein the data corresponding to the second band is transformed in bit mapped form suitable for printing after data from the first band is so transformed.

11. A page composition method according to any of claims 1–6 and including zeroing the pixel values in a buffer memory after data from the memory is transferred therefrom.

12. A page composition method according to claim 11 and including repeating (c)–(e) for an additional band, wherein said data is written into a buffer memory into which data for another band was written previously after such data was transferred therefrom.

13. A page composition method according to claim 2 and including:
   determining the relative layer of the overlapping elements,
   wherein the portions of the elements in the band are transferred to the buffer memory in an order which corresponds to the determined layer of the overlapping elements.

14. A page composition method according to claim 13 wherein certain of the pixel values are indicated as being opaque and wherein pixel data firm the underlying layer is replaced by data from an overlying opaque layer.

15. A page composition method according to claim 13 wherein certain of the pixel values are indicated as being of a transitional nature and wherein the data in the buffer is a combination of the data in an overlapping layer and in an underlying layer.

16. A page composition method according to claim 15 wherein the combination of data is a weighted average of the pixel values in the upper and lower layers.

17. A page composition method according to any of claims 1–6 wherein overlapping elements comprise elements selected from image and line work elements.

18. A page composition method according to any of claims 1–6 wherein the overlapping elements are color elements and wherein separate color separations are generated for each color.

19. A page composition method for composing a page from elements in a continuous tone pixelized form or in a bit-mapped form for printing comprising:
   (a) determining the position of the elements on a printed page;
   (b) dividing the page into bands;
   (c) serially transferring pixel data values for sections of bands corresponding tee portions of respective elements in a band, to a band buffer memory, wherein the data from the portion of one element in a band is completely read prior reading data corresponding to the portion of the second element in the band;
   (d) writing the data to the band buffer memory as it is read; and
   (e) transferring the data from the band buffer memory when all the data corresponding to all portions of all elements in the band is written in the band buffer memory,
   wherein a band contains overlapping portions of two elements.

* * * * *